(12) United States Patent
Partanen

(10) Patent No.: US 7,700,672 B2
(45) Date of Patent: Apr. 20, 2010

(54) RECYCLED TIRE RUBBER EMULSIONS AND PROCESSES

(76) Inventor: John Eric Partanen, 763 Tejon Ave., Colton, CA (US) 92324

( * ) Notice: Subject to any disclaimer, the term of this patent is extended or adjusted under 35 U.S.C. 154(b) by 402 days.

(21) Appl. No.: 11/592,436

(22) Filed: Nov. 2, 2006

(65) Prior Publication Data

US 2007/0049664 A1    Mar. 1, 2007

Related U.S. Application Data

(63) Continuation-in-part of application No. 10/808,960, filed on Mar. 24, 2004, now abandoned.

(60) Provisional application No. 60/491,136, filed on Jul. 30, 2003.

(51) Int. Cl.
*C08L 95/00* (2006.01)

(52) U.S. Cl. ......................................................... 524/60

(58) Field of Classification Search .................. 524/60, 524/61
See application file for complete search history.

(56) References Cited

U.S. PATENT DOCUMENTS 7,160,949 B2 *    1/2007    Ota et al. ..................... 525/242

* cited by examiner

*Primary Examiner*—Peter Szekely
(74) *Attorney, Agent, or Firm*—James M. Duncan, Esq.; Klein, DeNatale, Goldner, et al.

(57) ABSTRACT

Petroleum asphalt emulsions which contain recycled tire rubber and processes for making the emulsions at temperatures above ambient or room temperature. These emulsions may contain significant quantities of recycled tire rubber and recycled and reclaimed motor oils and fluxes. All of these formulations meet current specifications for products used to make slurry seal asphalt pavement coatings, ASTM D 1227 emulsified asphalt roof coatings, and may have applications as crack fillers for asphalt and Portland cement pavements, and as parking lot seal-coat materials.

7 Claims, No Drawings

RECYCLED TIRE RUBBER EMULSIONS AND PROCESSES

This is a Continuation-In-Part of application Ser. No. 10/808,960 which was filed on Mar. 24, 2004 now abandoned, and for which the inventor claimed domestic priority on Provisional Application No. 60/491136, filed on Jul. 30, 2003.

BACKGROUND OF THE INVENTION

This invention relates to improved petroleum asphalt granulated recycled tire rubber emulsions and processes for making them. Historically, these types of emulsions made from mixtures with the granulated recycled tire rubber pre-reacted with petroleum asphalt are difficult to make, and once made have short shelf life. The processes of making emulsions from unmodified petroleum asphalt involve using high shear mixers to generate and disperse tiny droplets of the petroleum asphalt in an aqueous solution of chemicals. Similarly, polymer modified asphalts may be emulsified with high shear mixers typically at temperatures above 100 C (212 F) and passing these emulsions through heat exchangers to lower the temperatures below 100 C (212 F) to keep them from separating. Petroleum asphalt modified with granulated recycled tire rubber is very resistant to being dispersed into tiny droplets by the high shear mixers. Elevating the heat of the granulated recycled tire rubber to temperatures where it may be sheared into tiny droplets may result in emulsions being made above 100 C (212 F) that are to thick to pass through a heat exchanger. Mixtures of kaolin or bentonite clay in water used as emulsifying agents do not make high quality emulsions due to the high resistance to shear, and long term stability as previously mentioned. The objective of this invention is to disclose specific formulations and specific processes for making granulated recycled tire rubber modified petroleum asphalt emulsions that are high in quality and have long term stability and shelf life. These improved, unique, and innovative emulsions are made at temperatures above what may be considered ambient temperatures from granulated recycled tire rubber mixed with petroleum asphalt at temperatures of 176.6 C (350 F) to 260 C (500 F). These improved, unique, and innovative emulsions may also be modified with ingredients including polymers, tall oil pitch, gilsonite, refined saturated petroleum oil, reclaimed, re-refined and recycled motor oil, nonylphenol surfactants, chromium bearing chemicals, caustic soda, sodium metasilicate pentahydrate, and sand, or mineral aggregates.

REVIEW OF PRIOR ART

U.S. Pat. Nos. 5,539,029 and 5,811,477 by Burris disclose adding granulated recycled tire rubber to an asphalt emulsion modified by clay in water mixtures and then mixing these tire rubber modified emulsions with sand and aggregate to make asphalt pavement slurry seals. Burris does not disclose methods or formulations to emulsify petroleum asphalt-granulated recycled tire rubber mixtures, and indeed claims that his art is superior as it may be carried out at essentially ambient temperatures. Similarly, Wickett in U.S. Pat. No. 6,156,828 discloses a mixture comprised of solvent, tire rubber, water, nonylphenol surfactant, clay, and additives including atatic polypropylene which is added to an asphalt emulsion at ambient temperatures. Wickett does not emulsify petroleum asphalt-granulated recycled tire rubber mixtures. Wickett adds tire rubber along with chemicals and water to an asphalt emulsion. Lemoine in U.S. Pat. No. 5,414,029 discloses a mixture of asphalt, aromatic oil, styrene butadiene polymer, organic silane, and sulfur emulsified with a mixture of water, polyvinyl alcohol, and bentonite clay. The mixture of water, polyvinyl alcohol and bentonite clay does not emulsify petroleum asphalt-granulated recycled tire rubber mixtures. Lemoine does not have granulated recycled tire rubber in any of his formulations, and does not disclose the requirement for ultra high shear two stage mixers required to emulsify petroleum asphalt-granulated recycled tire rubber mixtures. Fields in U.S. Pat. No. 5,973,037 discloses adding mixtures of petroleum asphalt and co-block polymers to mixtures of water, bentonite clay, and chemical additives. The co-block polymer asphalt mixtures emulsified by Fields do not include petroleum asphalt-granulated recycled tire rubber mixtures. The formulations and methods in Fields will not emulsify petroleum asphalt-granulated recycled tire rubber mixtures. Yap, in U.S. Pat. No. 6,776,833 discloses an emulsion comprised of water, bentonite clay, bitumen, and specialty additives including mineral salt, organic acid, polyacrylic acid, vinyl acrylic terpolymers, limestone powder, perlite, fiber, and water. None of these specialty additives include granulated recycled tire rubber. The bitumen referred to may be asphalts or coal tars but are not mixed with granulated recycled tire rubber prior to emulsification. Yap, in U.S. Pat. No. 6,786,962 discloses mixtures of bitumen, solvent, and polymers that are added to mixtures of water and bentonite clay using a single stage disperser. Yap does not disclose bitumen-granulated recycled tire rubber mixtures and does not disclose specific formulations that will emulsify the bitumen in his disclosures. In fact, simple bentonite clay in water mixtures as disclosed by Yap will not emulsify a bitumen, but must be further modified with chemicals to do so. A simple bentonite clay in water mixture will not emulsify a petroleum asphalt-granulated recycled tire rubber mixture without the addition of specific chemicals and without the use of an ultra high shear two stage mixer as disclosed in this invention.

SUMMARY OF THE INVENTION

The following examples disclose emulsions made from petroleum asphalt, and/or modified petroleum asphalt-granulated recycled tire rubber mixtures, and specific processes for making them. While depending upon the end use, some of the following formulations may provide superior results, all meet current specifications for products used to make slurry seal asphalt pavement coatings, seal coat asphalt pavements, ASTM D 1227 emulsified roof coatings, and have applications as crack fillers for asphalt and Portland cement pavements.

DETAILED DESCRIPTION OF THE INVENTION AND PROCESSES

Example 1

A mixture of 80.0 percent by weight AC-20 petroleum asphalt and 20.0 percent by weight minus 20 mesh granulated recycled tire rubber was prepared by mixing these two components together at 204 C (400 F) and maintaining and mixing this mixture at 304 C (400 F) for approximately 90 minutes. While the petroleum asphalt-granulated recycled tire rubber was mixing, a kaolin clay in water mixture comprising 46.0 percent by weight water at 32 C (90 F) to 38 C (100 F), 0.3 percent by weight sodium metasilicate pentahydrate and 53.7 percent by weight kaolin clay was prepared. The petroleum asphalt-granulated recycled tire rubber mixture was allowed to cool to between 162.8 C (325 F) and 204 C (400 F) and added to the kaolin clay in water mixture using an ultra high shear two stage mixer suspended in a vertical cylindrical tank. The first stage of the ultra high shear mixer comprises a rotary chopper within a shrouded zone that chops and reduces the petroleum asphalt-granulated recycled tire rubber mixture into small enough pieces to be emulsified by the second stage rotor-stator work head which is directly below the first stage chopper. The ultra high shear mixer depending upon the size of the batch of emulsion being made must be turning at between 1200 to 9000 rpm. The emulsion was formed at between 71 C (160 F) and 98.9 C (210 F), with additional water at 32 C (90 F) to 38 C 100 F) as necessary to keep the temperature of the emulsion being produced below 98.9 C (210 F) and to adjust the viscosity of the final emulsion, along with vinyl acrylic polymer latex and fiberglass fiber. This emulsion was comprised of 45.0 percent by weight water, 0.1 percent by weight sodium metasilicate pentahydrate, 32.0 percent by weight petroleum asphalt-granulated recycled tire rubber mixture, 5.0 percent by weight vinyl acrylic polymer latex, and 0.4 percent by weight fiberglass fiber. The residue by evaporation of this emulsion was 55.0 percent by weight. This emulsion was found to be a dimensionally stable cold applied crack filler for asphalt and Portland cement pavements, as an ASTM D 1227 Type IV protective coating for roofing, and as an ASTM D 1187 Type I protective coating for metal surfaces.

This emulsion was further mixed with water and sand, or crushed and sieve sized mineral aggregate conforming to Type I Slurry Seal aggregate specifications to form a slurry seal coating and/or seal coat for asphalt pavements. The slurry seal coating being comprised of 59.0 percent by weight sand or crushed and sieve sized mineral aggregate, 5.0 percent by weight added water, and 37 percent by weight of the petroleum asphalt-granulated recycled tire rubber emulsion.

Example 2

A mixture of 79.70 percent by weight AC-5 petroleum asphalt, 5.20 percent by weight refined saturated petroleum oil, 5.60 percent by weight tall oil pitch, 0.60 percent by weight caustic soda, 2.60 percent by weight styrene butadiene copolymer, 6.20 percent by weight minus 80 mesh granulated recycled tire rubber, and 0.10 percent by weight sulfur was prepared at 176.7 C (350 F) to 193.3. C (380 F) using a high shear mixer at 6000 rpm and stored overnight at 176.7 C (350 F). When tested the next day, this mixture was found to comply with specifications for Performance Grade ((PG) 70-40asphalt binder. A second mixture at 37.8 C (100 F) was prepared comprised of 93.15percent by weight water, 6.05 percent by weight bentonite clay, and 0.80 percent by weight sodium dichromate. To this mixture was added the first mixture of PG 70-40petroleum asphalt-granulated recycled tire rubber at 176.7 C (350 F) using an ultra high shear two stage mixer suspended in a vertical cylindrical tank. The first stage of this mixer comprises a rotary chopper within a shrouded zone that chops and reduces the petroleum asphalt-granulated recycled tire rubber into small enough pieces to be emulsified by the second stage rotor-stator warhead which is directly below the first stage rotary chopper. The ultra high shear mixer depending upon the size of the emulsion being made must be turning at 1200 to 9000 rpm. During the addition of the hot petroleum asphalt-granulated recycled tire rubber mixture, 1.00 percent by weight of nonylphenol surfactant with 40 moles of ethylene oxide was added to reduce the viscosity of and enhance the quality of the emulsion being produced. A thick brown colored emulsion was produced comprised of 46.20 percent by weight water, 0.40 percent by weight sodium dichromate, 3.00 percent by weight bentonite clay, 49.40 percent by weight PG 70-40 petroleum asphalt-granulated recycled tire rubber, and 1.00 percent by weight nonylphenol surfactant. The residue of this emulsion was found to 53.8 percent by weight. This emulsion was found to be satisfactory as a slurry seal and/or seal coat for asphalt pavement when mixed with 53 to 65 percent by weight sand or crushed and sieve sized mineral aggregate meeting the specifications for Type II slurry seal aggregate, moistened with 2 to 8 percent by weight added water, and 33 to 41 percent by weight of the example 2 emulsion. This improved, unique and innovative emulsion was also found to comply with specifications for ASTM D 1227 Type III roof coating and as a cold applied crack filler for asphalt and Portland cement pavements.

Example 3

A petroleum asphalt-granulated recycled tire rubber mixture was prepared by mixing 62.50 percent by weight Performance Grade (PG) 64-22 petroleum asphalt with 10.00 percent by weight minus 30 mesh granulated recycled tire rubber at 260 C (500 F) for 15 minutes and then adding 11.50 percent by weight tall oil pitch, 7.00 percent by weight gilsonite, and 9.00 percent by weight reclaimed, re-refined and recycled motor oil flux. This petroleum asphalt-granulated recycled tire rubber mixture was then allowed to cool to 162.8 C (325 F) to 190.6 C (375 F). While the petroleum asphalt-granulated recycled tire rubber mixture was cooling, a second mixture comprised of 92.10 percent by weight water, 0.47 percent by weight sodium chromate, 3.48 percent by weight nonylphenol surfactant, and 3.95 percent by weight bentonite clay was prepared at 31.1 C (88 F). The petroleum asphalt-granulated recycled tire rubber mixture was then added to the second clay and chemical in water mixture using an ultra high shear two stage mixer suspended in a vertical cylindrical tank operating at 6000 to 9000 rpm. The first stage of the ultra high shear mixer is a chopper in shrouded zone that chops and reduced the petroleum asphalt-granulated recycled tire rubber mixture into small enough pieces to be emulsified by the second stage rotor-stator work head below the first stage chopper. The resulting emulsion was mixed for an additional 30 minutes with the ultra high shear two stage mixer turning at 6000 rpm. When completed, the emulsion had a temperature of 87.8 C (190 F). An additional 2.25 percent by weight minus 30 mesh granulated recycled tire rubber was then added along with 2.05 percent by weight cationic polymer latex, and the emulsion then allowed to cool to 23.9 C (75 F). The residue of this emulsion was found to be 50.52 percent by weight. The viscosity of the emulsion when tested with a Brookfield Viscosimeter with a # 6 spindle at 10 rpm was 3800 centipoises. This emulsion was comprised of 49.00 percent by weight water, 0.25 percent by weight sodium chromate, 1.85 percent by weight nonylphenol surfactant, 2.10percent by weight bentonite clay, 42.50 percent by weight petroleum asphalt-granulated recycled tire rubber mixture, 2.25 percent by weight additional minus 30 mesh granulated-recycled tire rubber, and 2.05 percent by weight cationic polymer latex. This petroleum asphalt-granulated recycled tire rubber emulsion was found to be satisfactory as a slurry seal and/or seal coat for asphalt pavement by combining it with 53 to 65percent by weight sand or crushed and sieve sized mineral aggregate meeting specifications for Type II slurry seal aggregate moistened with 2 to 8 percent by weight water, with 33 to 41 percent by weight of emulsion added and mixed and applied to asphalt pavement and allowed to cure. This improved, unique, and innovative emulsion was also found to comply with specifications for ASTM D 1227 Type III roof coating, and as a cold applied crack filler for asphalt and Portland cement pavements.

Example 4

A modified petroleum asphalt-granulated tire rubber mixture was prepared by mixing 61.0 percent by weight Performance Grade (PG) 70-10 petroleum asphalt with 16.0 percent by weight reclaimed, re-refined and recycled motor oil flux, 17.0 percent by weight minus 70 mesh mineral filler comprised of a mixture of iron oxide, iron sulfide, iron, carbon and magnesium iron oxide, and 6.0 percent by weight minus 30 mesh granulated recycled tire rubber at 162.5 C (325) to 204 C (400 F) using a high shear mixer. While the modified petroleum asphalt-granulated tire rubber mixture was mixing, a second mixture comprised of 90.2 percent by weight water, 0.1 percent by weight caustic soda, 5.7 percent by weight bentonite clay, and 4.0 percent by weight nonylphenol surfactant was prepared at 31.1 C (88 F) using an ultra high shear two stage mixer operating at 3500 to 6000 rpm. An acceptable range of the nonylphenol surfactant is from 0.1 to 10 percent by weight. The ultra high shear two stage mixer was suspended in a vertical cylindrical mixing vessel. The first stage of the ultra high shear mixer is a chopper just below, or within a shrouded zone above the second stage rotor stator work head. The speed of the ultra high shear mixer was increased to 6000 rpm and the mixture of modified petroleum asphalt granulated tire rubber mixture at 162.5 C (325 F) to 204 C (400 F) was slowly added to the second mixture. The resulting emulsion was mixed for an additional 30 minutes using the ultra high shear mixer at 6000 rpm. At the end of this period of time, 5 percent by weight of anionic polymer latex was added and mixing continued for another 10 minutes. An acceptable range of the anionic polymer latex is 0.1 to 10 percent by weight. The resulting emulsion had a temperature of 90 C (195 F). The viscosity of this emulsion was found to be 12345 cps at 25 C (77 F) when tested with a Brookfield Viscosimeter. The residue by evaporation of this emulsion was found to be 55.04 percent by weight. This emulsion was comprised of 30.13 percent by weight petroleum asphalt, 7.90 percent by weight reclaimed, re-refined and recycled motor oil flux, 8.40 percent by weight of a mineral filler comprised of iron oxide, iron sulfide, iron, carbon, and magnesium iron silicate, 2.96 percent by weight granulated recycled tire rubber, 41.14 percent by weight water, 0.05 percent by weight caustic soda, 2.60 percent by weight bentonite clay, 1.82 percent by weight nonylphenol surfactant, and 5.0 percent by weight anionic polymer latex. This modified petroleum asphalt granulated tire rubber emulsion was found to be satisfactory as a cold applied crack filler for asphalt and Portland cement pavements, as an ASTM D 1227 Type III roof coating, as an asphalt pavement seal coat when mixed with additional water and crushed and sieve sized minus 16 mesh sand, and as an asphalt pavement slurry seal coating when mixed with crushed and sieve sized Type II slurry seal mineral aggregate.

Example 5

A modified petroleum asphalt granulated tire rubber mixture was prepared by mixing 58.0 percent by weight Performance Grade (PG) 70-10 petroleum asphalt with 4.0 percent by weight clear paraffinic, or saturated re-refined motor oil, 16.0 percent by weight reclaimed and re-refined motor oil flux, 16.0 percent by weight of a minus 200 mesh crushed mineral aggregate comprised of calcium carbonate or limestone, and 6.0 percent by weight minus 30 mesh granulated recycled tire rubber at 162.5 C (325 F) to 204 C (400 F) using a high shear mixer. While the modified petroleum asphalt-granulated recycled tire rubber was mixing, a second mixture identical to the second mixture of example 4 was prepared with the same ultra high shear mixer as used in example 4. The modified petroleum asphalt-granulated tire rubber mixture at 162.5 C (325) to 204 C (400 F) was then slowly added to the second mixture with the ultra high shear two stage mixer turning at 6000 to 7500 rpm and mixing continued for an additional 30 minutes until an emulsion was formed at 92.9 C (201 F). After mixing using the ultra high shear mixer for 30 minutes, 5 percent by weight of anionic polymer latex was added, and the mixing continued for another 10 minutes. The viscosity of this emulsion when tested with a Brookfield Viscosimeter was found to be 10653 cps at 25 C (77 F). The residue by evaporation of this emulsion was found to be 50.6 percent by weight. This emulsion was comprised of 25.90 percent by weight petroleum asphalt, 1.79 percent by weight re-refined and recycled saturated oil, 7.14 percent by weight reclaimed and re-refined recycled motor oil flux, 7.14 percent by weight minus 200 mesh calcium carbonate limestone mineral aggregate, 2.68 percent by weight minus 30 mesh granulated recycled tire rubber, 45.42 percent by weight water, 0.05 percent by weight caustic soda, 2.87 percent by weight bentonite clay, 2.01 percent nonylphenol surfactant, and 5.00 percent by weight anionic polymer latex. This emulsion was found to be satisfactory as a cold applied crack filler for asphalt and Portland cement pavements, as an ASTM D 1227 Type III roof coating, as an asphalt pavement seal coat when mixed with additional water and minus 16 mesh sand, and as an asphalt slurry seal coat when mixed with additional water and Type II slurry seal crushed and sieve sized mineral aggregate.

What is claimed is:

1. A composition of a modified petroleum asphalt-granulated recycled tire rubber emulsion which may be used as a cold applied crack filler for Portland cement and asphalt pavements, as a cold applied roof coating, as a seal coat for asphalt pavement, and as a slurry seal coating for asphalt pavement, the composition comprising:

a first mixture of 45 to 65 percent by weight petroleum asphalt, 10 to 20 percent by weight recycled and re-refined motor oil flux, 1 to 25 percent by weight mineral filler comprised of a mixture of iron oxide, iron sulfide, iron, carbon, and magnesium iron silicate, and 5 to 20 percent by weight minus 10 mesh to minus 80 mesh granulated recycled tire rubber;

a second mixture comprising 90 to 94 percent by weight water, 0.01 to 1.0 percent by weight caustic soda, 2 to 7 percent by weight bentonite clay, and 0.1 to 4 percent by weight nonylphenol surfactant, the first mixture added to the second resulting in a final emulsion comprised of 40 to 60 percent by weight water, 0.01 to 0.05 percent by weight caustic soda, 1 to 4 percent by weight bentonite clay, 1 to 3 percent by weight nonylphenol surfactant, 20 to 30 percent by weight petroleum asphalt, 3 to 10 percent by weight recycled and re-refined motor oil flux, 1 to 10 percent by weight mineral filler comprised of a mixture of iron oxide, iron sulfide, iron, carbon, and magnesium iron silicate, 1 to 5 percent by weight minus 10 mesh to minus 80 mesh granulated recycled tire rubber, and 1 to 10 percent by weight anionic polymer latex.

2. A seal coat mixture or slurry seal coating for asphalt pavement comprising 33 to 41 percent by weight of the composition of claim 1 to which is added 53 to 65 percent by weight sand, or crushed and sieve sized mineral aggregate and 2 to 8 percent by weight water.

3. The composition of claim 2 wherein the crushed and sieve sized mineral aggregate includes mined rock, mined sand, crushed and sieve sized Portland cement, or crushed and sieve sized recycled asphalt pavement, and any combinations thereof.

4. The composition of claim 1 wherein 2 to 5 percent by weight minus 10 mesh to minus 80 mesh granulated recycled tire rubber is added.

5. A composition of a modified petroleum asphalt-granulated recycled tire rubber emulsion which may be used as a cold applied crack filler for Portland cement and asphalt pavements, as a roof coating, as a seal coat for asphalt pavement, and as a slurry seal coating for asphalt pavement, the composition comprising:
   a first mixture of 40 to 60 percent by weight petroleum asphalt, 0 to 10 percent by weight re-refined and recycled saturated oil, 10 to 20 percent by weight recycled and re-refined motor oil flux, 10 to 25 percent by weight minus 200 mesh calcium carbonate limestone mineral filler, and 5 to 15 percent by weight minus 10 mesh to minus 80 mesh granulated recycled tire rubber;
   a second mixture comprising 90 to 94 percent by weight water, 0.01 to 1.0 percent by weight caustic soda, 2 to 7 percent by weight bentonite clay, and 0.1 to 4 percent by weight nonylphenol surfactant;
   the first mixture added to the second resulting in an emulsion comprised of 40 to 60 percent by weight water, 0.01 to 0.5 percent by weight caustic soda, 1 to 4 percent by weight bentonite clay, 0.1 to 2 percent by weight nonylphenol surfactant, 20 to 30 percent by weight petroleum asphalt, 0 to 5 percent by weight re-refined and recycled saturated oil, 5 to 10 percent by weight recycled and re-refined motor oil flux, 5 to 13 percent by weight minus 200 mesh calcium carbonate limestone mineral filler, and 2 to 8 percent by weight minus 10 mesh to minus 80 mesh granulated recycled tire rubber to which is added 0.1 to 10 percent by weight anionic polymer latex.

6. A seal coat mixture or slurry seal coating for asphalt pavement comprising 33 to 41 percent by weight of the composition of claim 5 to which is added 53 to 65 percent by weight sand, or crushed and sieve sized mineral aggregate, and 2 to 8 percent by weight water.

7. The composition of claim 6 wherein the crushed and sieve sized mineral aggregate includes mined sand, mined rock, crushed and sieve sized recycled Portland cement, or crushed and sieve sized recycled asphalt pavement, or any combinations thereof.

* * * * *